(12) United States Patent
Gong et al.

(10) Patent No.: US 9,527,253 B2
(45) Date of Patent: Dec. 27, 2016

(54) MULTI-CHAMBER TIRE MANUFACTURING MOLD

(71) Applicant: CHENGDU YOUYANG ELECTROMECHANICAL PRODUCT DESIGN CO., LTD., Chengdu, Sichuan (CN)

(72) Inventors: Shugang Gong, Guangdong (CN); Shaobo Yang, Guangdong (CN); Xiaoling Li, Guangdong (CN); Xingyin Wu, Guangdong (CN); Lei Peng, Guangdong (CN)

(73) Assignee: Chengdu Youyang Electromechanical Product Design Co., Ltd., Chengdu, Sichuan (CN)

( * ) Notice: Subject to any disclaimer, the term of this patent is extended or adjusted under 35 U.S.C. 154(b) by 0 days.

(21) Appl. No.: 15/024,477

(22) PCT Filed: Sep. 25, 2013

(86) PCT No.: PCT/CN2013/084139
§ 371 (c)(1),
(2) Date: Mar. 24, 2016

(87) PCT Pub. No.: WO2015/042788
PCT Pub. Date: Apr. 2, 2015

(65) Prior Publication Data
US 2016/0236429 A1  Aug. 18, 2016

(51) Int. Cl.
*B29D 30/06* (2006.01)
*B29C 33/48* (2006.01)
(Continued)

(52) U.S. Cl.
CPC ........... *B29D 30/0606* (2013.01); *B29C 33/48* (2013.01); *B29D 30/0061* (2013.01); *B29D 30/06* (2013.01); *B60C 5/24* (2013.01); *B29C 33/30* (2013.01)

(58) Field of Classification Search
CPC ..... B29C 33/30; B29C 33/48; B29D 30/0606; B60C 5/24
See application file for complete search history.

(56) References Cited

U.S. PATENT DOCUMENTS 4,267,873 A * 5/1981 McColl .................. B29D 30/08
152/209.12
5,449,483 A * 9/1995 Greenwood .......... B29C 33/565
164/165

FOREIGN PATENT DOCUMENTS

CN 101219567 7/2008
CN 201760991 3/2011
(Continued)

OTHER PUBLICATIONS

International Search Report of PCT/CN2013/084139 dated Jun. 18, 2014.

*Primary Examiner* — James Mackey
(74) *Attorney, Agent, or Firm* — Rankin, Hill & Clark LLP

(57) ABSTRACT

A multi-chamber tire manufacturing mold, comprising an upper holding plate and a lower holding plate having an interval between the upper holding plate and the lower holding plate; a tire periphery forming slider, a tire inner chamber forming slider, an upper mold block, a lower mold block, and a central mold post are arranged in the interval; the upper holding plate is connected to the plurality of upper mold blocks, and the lower holding plate is connected to a plurality of lower mold blocks, forming an enclosed chamber; the tire inner chamber forming slider arranged in the enclosed chamber, forming a flexible portion chamber and a partitioned chamber, such that isolating chambers are (Continued)

formed in the flexible portion; the openings of which together with the tire periphery forming slider form an enclosed chamber via process sealing members and fill the forming outer body.

11 Claims, 9 Drawing Sheets

(51) Int. Cl.
    *B29D 30/00*     (2006.01)
    *B60C 5/24*     (2006.01)
    *B29C 33/30*     (2006.01)

(56)     References Cited

FOREIGN PATENT DOCUMENTS

| EP | 0668136 | 8/1995 |
|---|---|---|
| JP | 2006-281709 | 10/2006 |

\* cited by examiner

MULTI-CHAMBER TIRE MANUFACTURING MOLD

FIELD OF THE APPLICATION

The invention relates to the technical field of multi-chamber tires, especially to a multi-chamber tire manufacturing mold.

BACKGROUND OF THE APPLICATION

Tires are essential parts for each type of vehicle apparatus, a tire comprises an outer layer portion and a flexible portion; the outer layer portion and the flexible portion are respectively configured as annular shapes, and the outer layer portion is arranged around outside of the flexible portion and contacts with the ground directly when the tire is rolling.

As a flexible deformation body, the flexible portion is provided with a chamber which is arranged around the flexible portion; after the chamber is inflated, the tire can be ensured to keep a flexible state and withstand relatively big dynamic load along the radial direction, thereby ensuring the requirement of high-speed run. However, the flexible portion in the prior art is merely provided with a single chamber; when the outer layer portion is punctured and pierced by an external object, the entire chamber would be connected with the outside and hence air leakage would happen, and the flexible performance of the flexible portion would be extremely weakened. Therefore, during the rolling process, the tire can hardly withstand relatively big dynamic load along the radial direction to meet the requirement of high-speed run, and the entire tire would be prone to be damaged and scraped so that it is unable to use, which may significantly affect the service life and performance of the tire.

SUMMARY OF THE APPLICATION

The purpose of the invention is to provide a method for manufacturing a multi-chamber tire, and to overcome the problem that the flexible portion of the tire in the prior art is merely provided with one chamber, and when the chamber is punctured and pierced by an external object, the tire can hardly withstand relatively big dynamic load and would be prone to be damaged and scraped so that it is unable to use.

The invention is achieved as follows: a multi-chamber manufacturing mold comprising an upper holding plate and a lower holding plate; the upper holding plate and the lower holding plate are arranged alternately and in parallel with each other, and there are intervals between the upper holding plate and the lower holding plate.

A plurality of tire periphery forming sliders, upper mold blocks, lower mold blocks and central mold posts are arranged in the intervals; the tire periphery forming sliders are arranged along the height direction of the intervals, and the plurality of tire periphery forming sliders are connected in order and arranged in an annular fashion; the central mold posts are arranged along the height direction of the intervals in an annular fashion, located at the inner side of the plurality of tire periphery forming sliders, and arranged alternately with the plurality of tire periphery forming sliders; the central mold post is provided with a forming part inside which is arranged around the central mold post.

An lower end of the upper holding plate is connected with a plurality of upper mold blocks which is arranged in a circle; an enclosed chamber is formed among the plurality of upper mold blocks, the plurality of lower mold blocks, the forming parts, and the plurality of tire periphery forming sliders;

The chamber is provided therein with a plurality of tire inner chamber forming sliders, which are connected in order arranged around the chamber; the tire inner chamber forming slider includes a circumferential ring which is arranged around a circumference; an external side of the circumferential ring is abutted against the tire periphery forming sliders, an inner side of the circumferential ring is provided with a plurality of spacedly arranged bosses, and there are gaps between adjacent bosses; a flexible portion chamber configured to fill the forming flexible portion is form among the bosses of the tire inner chamber forming sliders and the forming part, the upper mold blocks, and the lower mold blocks; an partitioned chamber, which is communicated with the upper mold blocks, the lower mold blocks, and the forming parts and fills a forming partitioned gusset so as to form a plurality of isolating chambers which are isolated from each other in the flexible portion, is arranged between adjacent tire inner chamber forming sliders; the partitioned chamber has an outwards opening.

At the opening of the partitioned chamber there is provided with an opening closure plate, which is configured to be abutted against the opening of the partitioned chamber after the partitioned chamber is filled with the forming flexible portion and the tire inner chamber forming sliders are removed; an outer layer chamber configured to be filled with the outer layer chamber of the forming outer layer portion is formed between the opening closure plates and the tire periphery forming sliders; the outer layer chamber is arranged in a circle.

Compared with the prior art, in the tire manufactured by the manufacturing mold of the invention, the flexible portion is provided with a plurality of isolating chambers; when the out layer portion is punctured by an external object and one isolating chamber is pierced, only a certain single isolating chamber is leaked; in this way, other un-punctured isolating chambers are still in the gas-filled state, and the tire can still function and run in a high speed, thereby withstanding relatively big dynamic load along the radial direction; when the external object punctures the out layer portion as well as adjacent isolating chambers, the partitioned gusset between the two adjacent isolating chambers withstands relatively big dynamic load, however, the tire can still function, and is adapt for running in a high speed; only in the case that adjacent isolating chambers are punctured by external bodies many times, the tire may be unsuitable to run in a high speed, and may require maintenance and repairing. Therefore, the multi-chamber tire can withstand the punctured situations many times and still meet the high-speed run requirement, so that the service life and performance of the tire are extremely improved.

DETAILED DESCRIPTION OF THE PREFERRED EMBODIMENT

The invention will be further described in detail accompanying with the drawings and embodiments in order to make the purpose, technical solutions and advantages of the invention more clear. It should be understood that the specific embodiments described herein are just for explanation and should not deemed as limitation to the invention.

The achievement of the invention will be described in detail accompanying with the specific embodiments.

Figure 1:
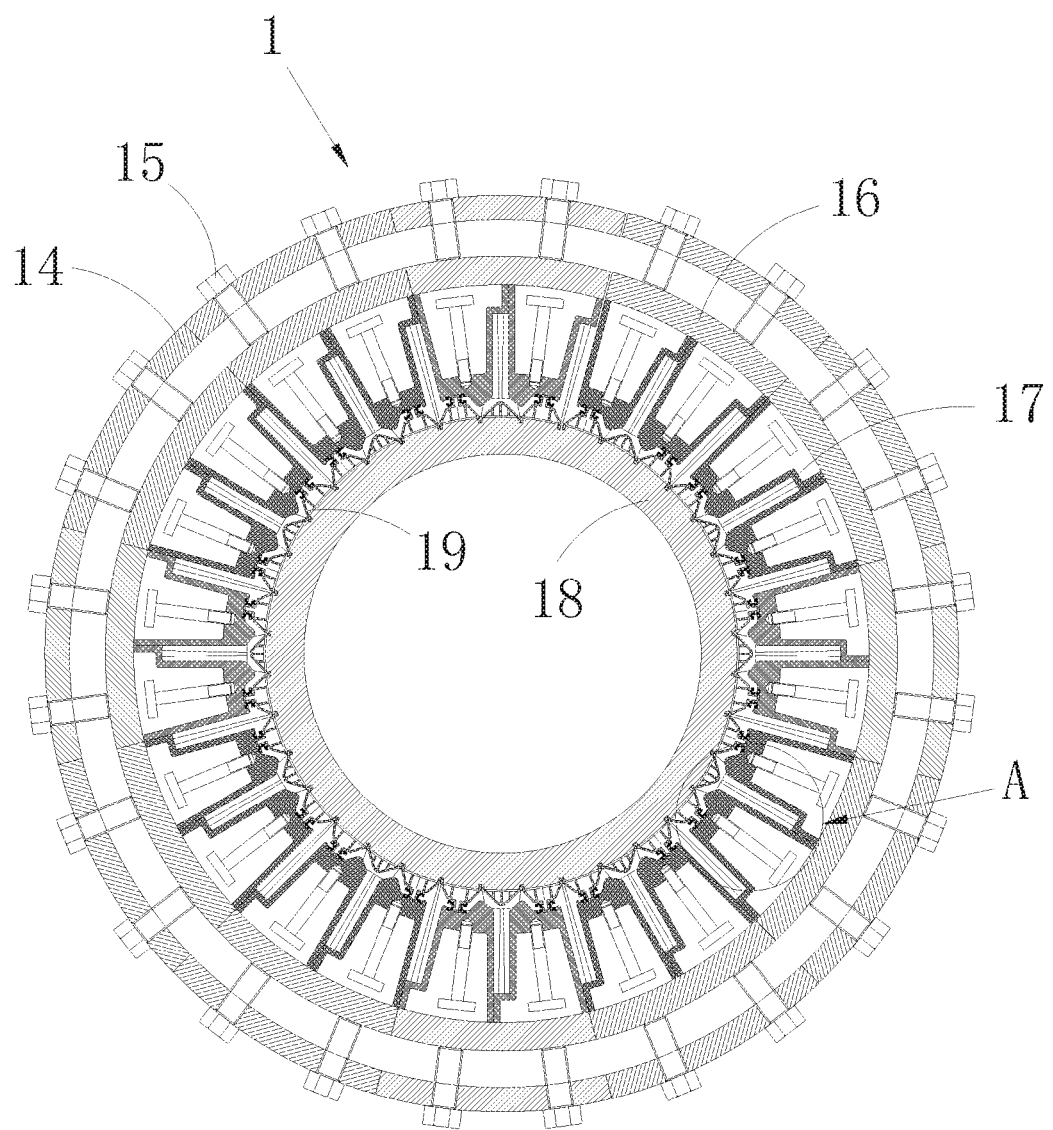
FIG. 1 is a first schematic cut-away view of a multi-chamber tire manufacturing mold provided by an embodiment of the invention.
Figure 2:
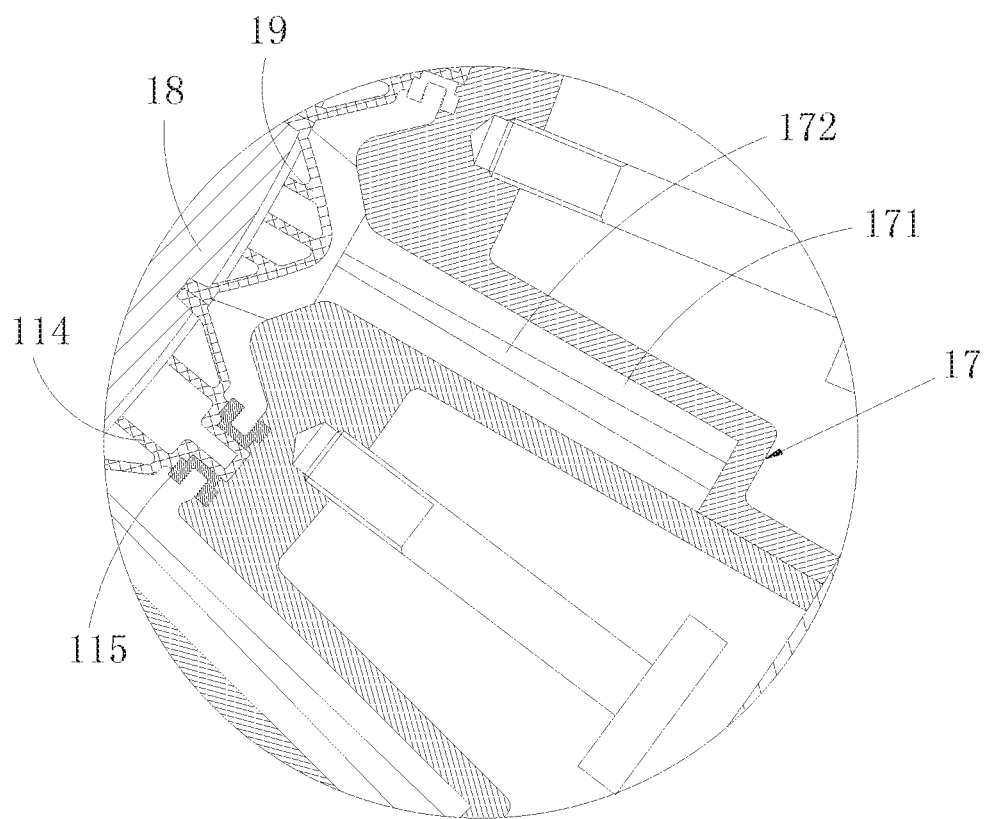
FIG. 2 is an enlarged view of the part A in FIG. 1.
Figure 3:
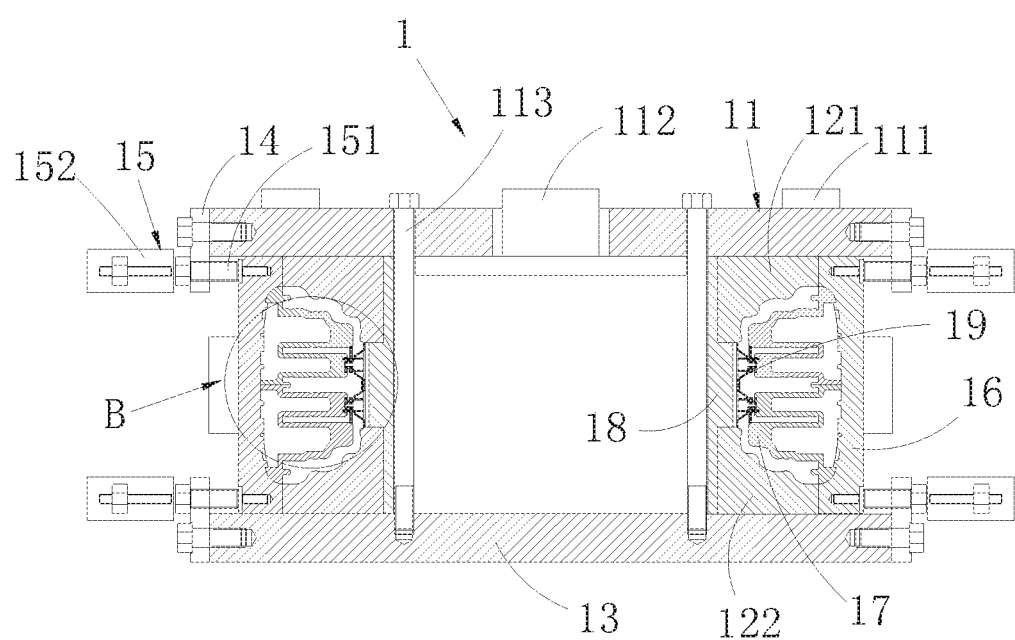
FIG. 3 is a second schematic cut-away view of the multi-chamber tire manufacturing mold provided by the embodiment of the invention.
Figure 4:
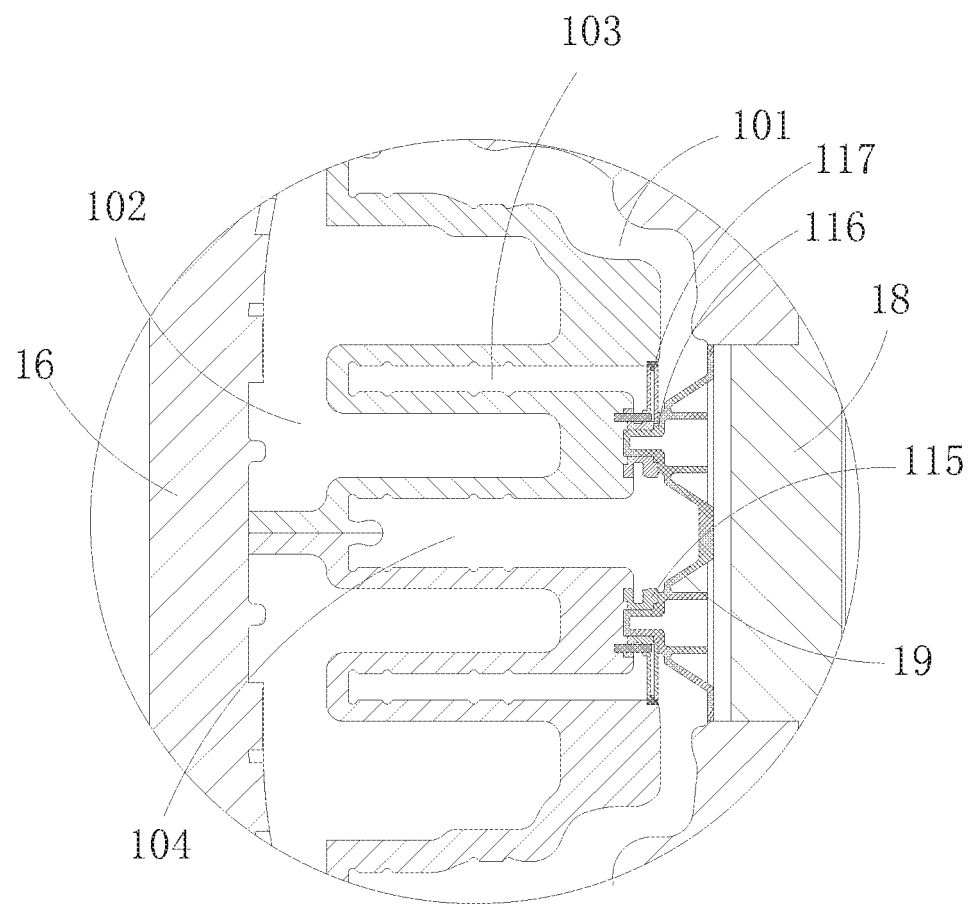
FIG. 4 is an enlarged view of the part B in FIG. 3.
Figure 5:
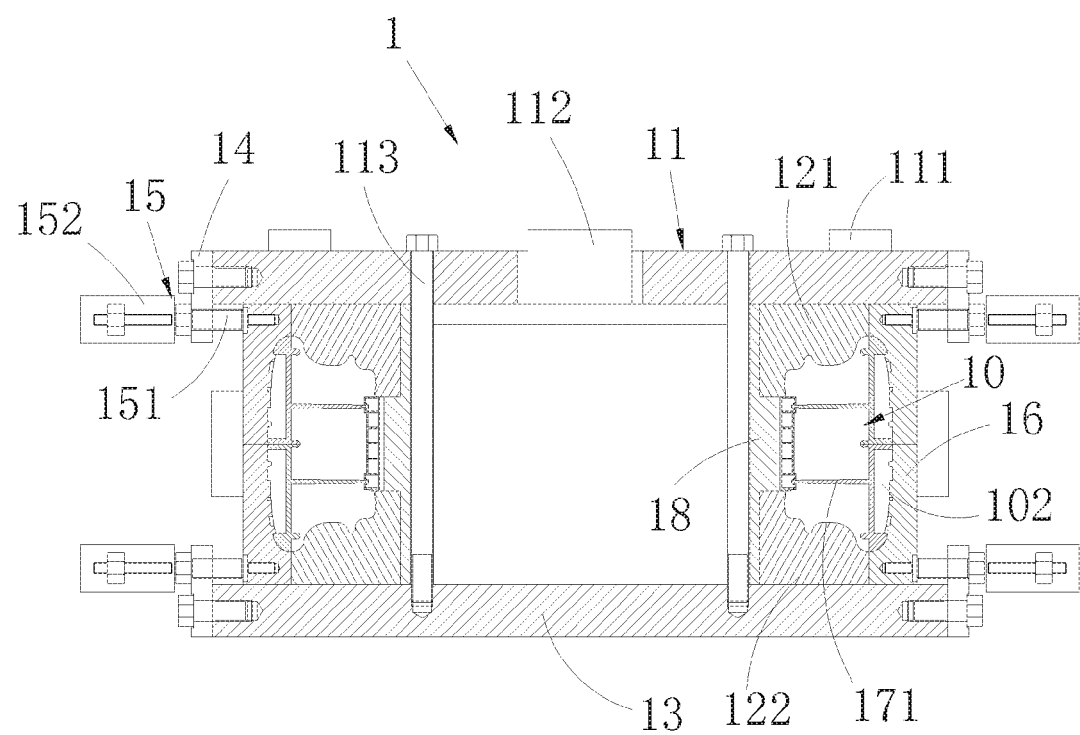
FIG. 5 is a third schematic cut-away view of the multi-chamber tire manufacturing mold provided by the embodiment of the invention.
Figure 6:
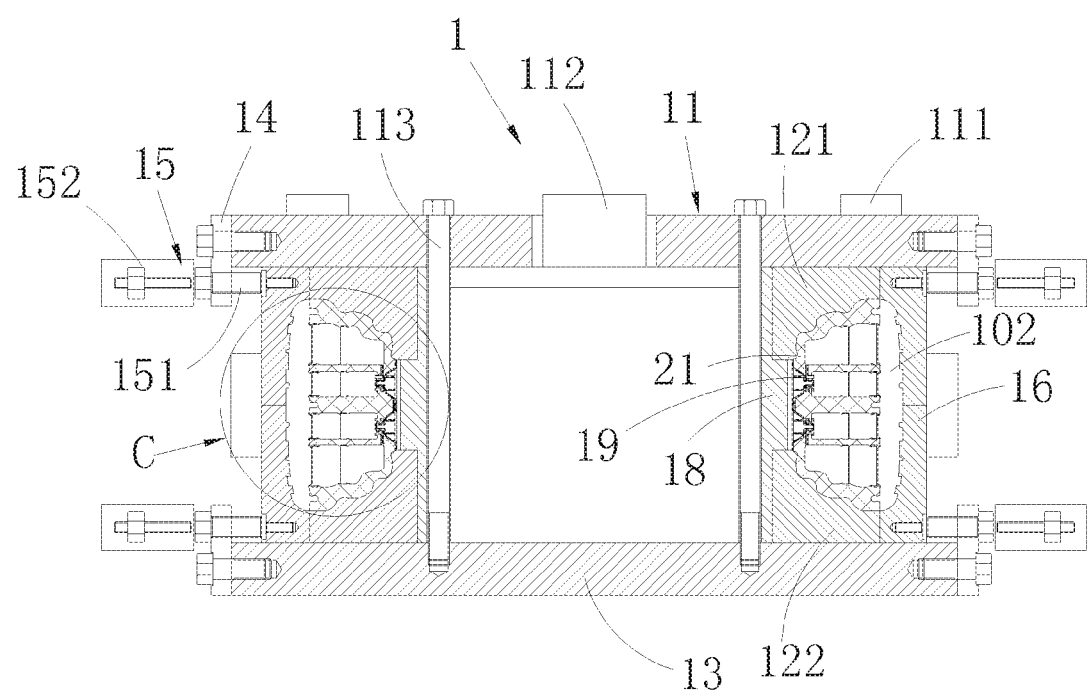
FIG. 6 is a fourth schematic cut-away view of the multi-chamber tire manufacturing mold provided by an embodiment of the invention.
Figure 7:
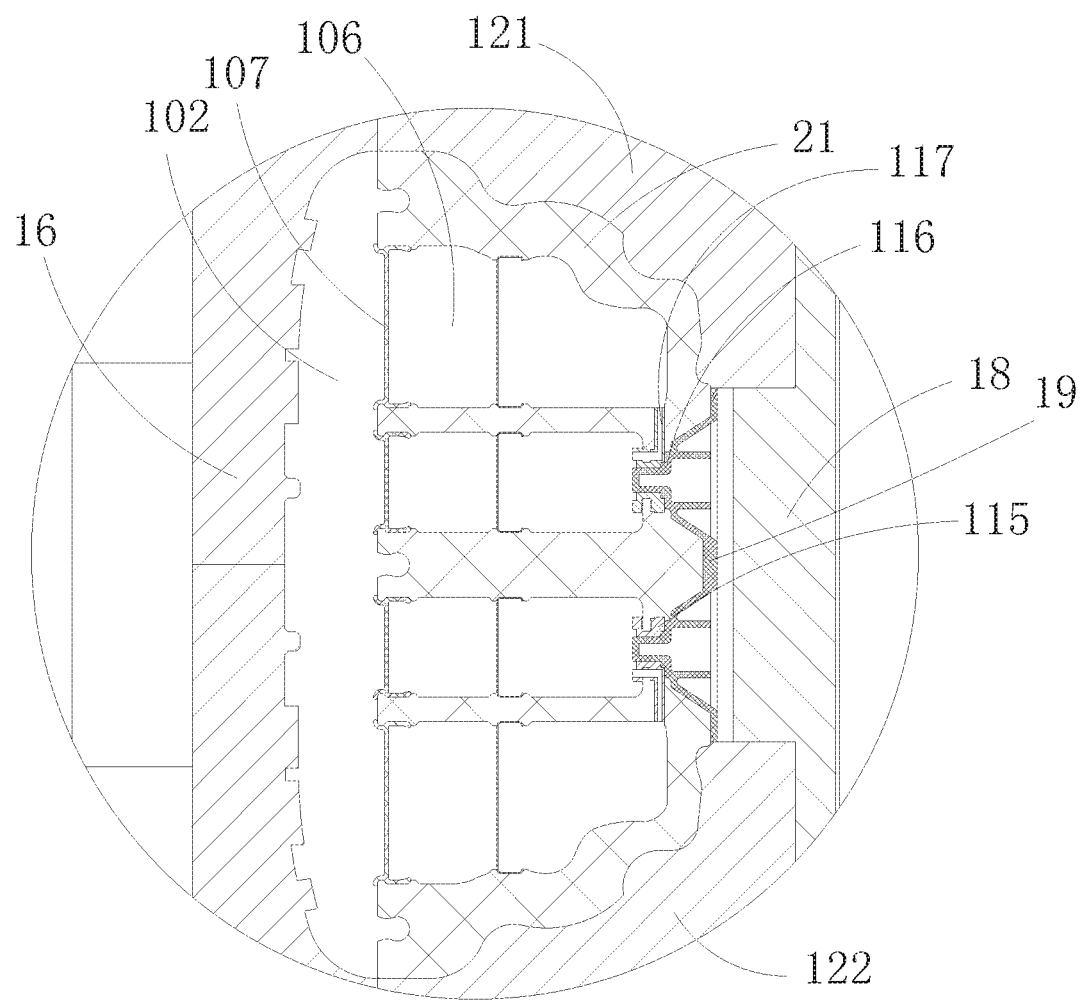
FIG. 7 is an enlarged view of the part C in FIG. 6.
Figure 8:
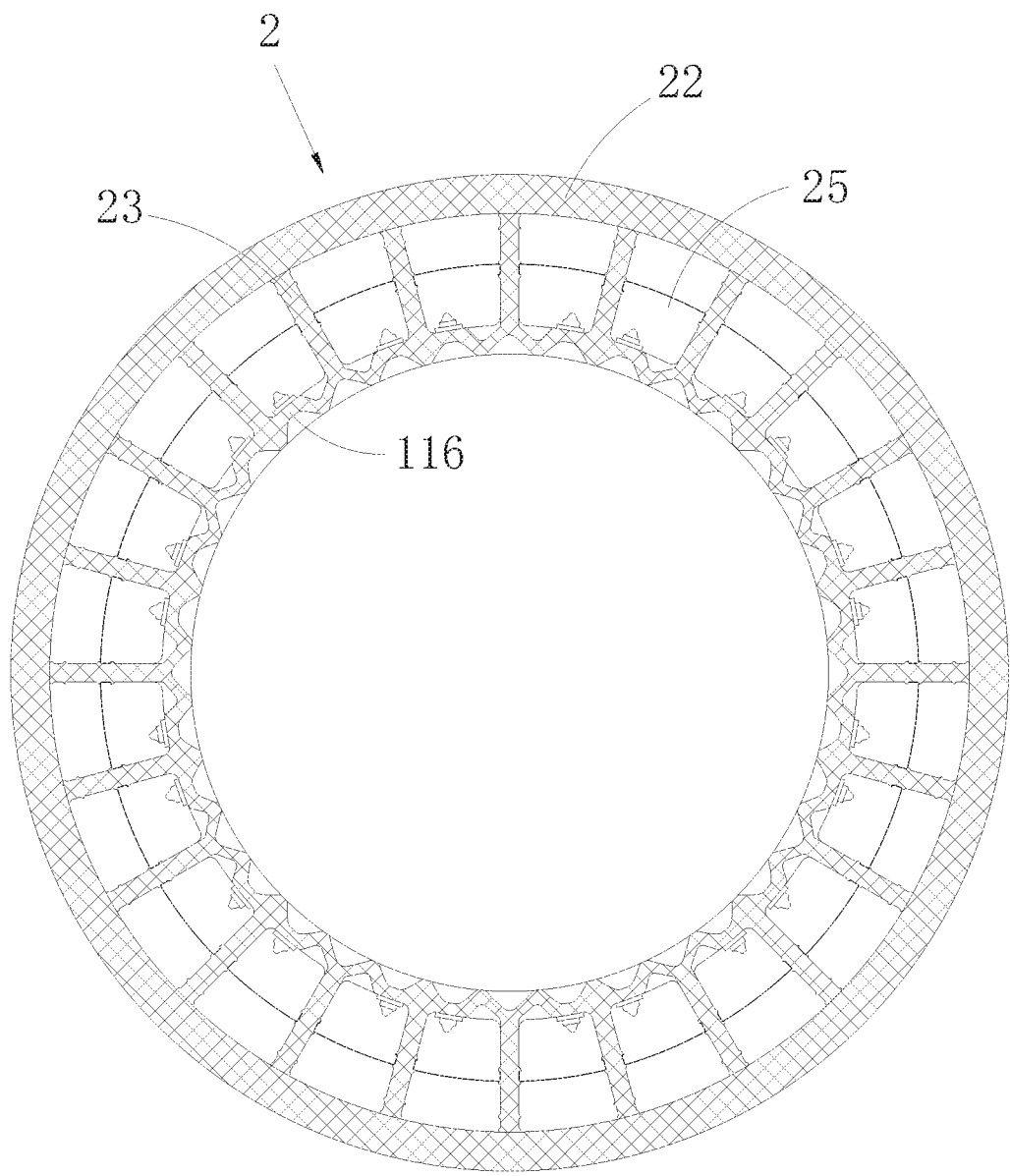
FIG. 8 is a schematic cut-away view of a multi-chamber tire manufactured by the multi-chamber tire manufacturing mold provided by the embodiment of the invention.
Figure 9:
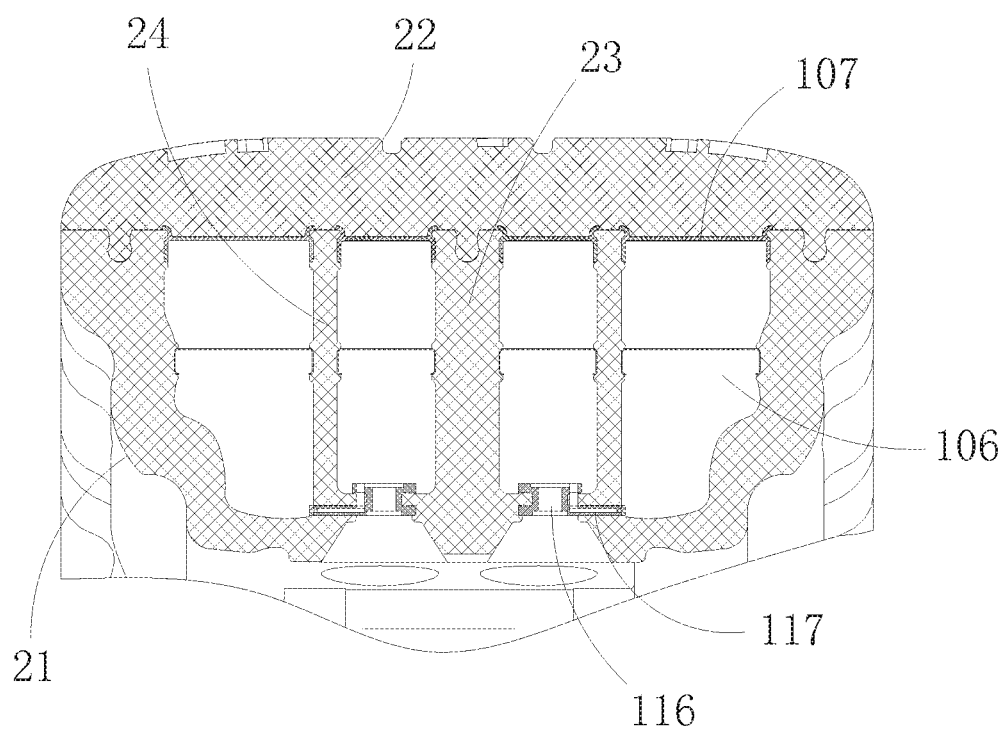
FIG. 9 is a partially schematic cut-away view of a multi-chamber tire manufactured by the multi-chamber tire manufacturing mold provided by the embodiment of the invention.

As shown in FIGS. 1-9, preferred embodiments of the invention are provided herein.

A manufacturing mold 1 provided by the embodiment is configured to manufacture a multi-chamber tire; the manufacturing mold 1 comprises an upper holding plate 11 and a lower holding plate 13; the upper holding plate 11 and the lower holding plate 13 are arranged alternately and in parallel with each other, and there is an interval between the upper holding plate 11 and the lower holding plate 13. Surely, the upper holding plate 11 is located above the lower holding plate 13; alternatively, the upper holding plate 11 can also be located below the lower holding plate 13 according to the change of placement of the mold 1. The "above" and "below" herein do not confine the absolute location.

A plurality of tire periphery forming sliders 16 and a plurality of central mold posts 18 are arranged in the intervals between the upper holding plate 11 and the lower holding plate 13; the plurality of tire periphery forming sliders 16 are arranged along a vertical direction of the intervals, and the sidewalls of the plurality of tire periphery forming sliders 16 are arranged to be abutted in order. Therefore, the plurality of periphery forming sliders 16 are arranged in a circular fashion and form a first annular post. The plurality of central mold posts 18 are arranged along the vertical direction of the intervals, and the plurality of central mold posts 18 are located at the inner side of the plurality of tire periphery forming sliders 16, sidewalls thereof being abutted other in order, therefore, the plurality of periphery forming sliders 16 are arranged in a circular fashion and form a second annular post. Therefore, an annular post is formed between the plurality of tire periphery forming sliders 18 and the plurality of central mold posts 18, and an annular chamber is formed between the tire periphery form sliders 16 and the central mold posts 18. Surely, the upper end and lower end of the annular chamber are respectively provided with openings.

The above mentioned central mold post 18 is provided with forming parts 19 which are arranged around the central mold post 18.

A plurality of upper mold blocks 121 and a plurality of lower mold blocks 122 are arranged in the above mentioned annular chamber. The plurality of upper mold blocks 121 are connected with the lower end of the upper holding plate 11, that is, located at the opening of the upper end of the annular chamber; the plurality of upper mold blocks 121 are connected in order and arranged around the upper end of the annular chamber, thereby enclosing the opening of the upper end of the annular chamber. Correspondingly, the plurality of lower mold blocks 122 are connected with the upper end of the lower holding plate 13, that is, located at the opening of the lower end of the annular chamber; the plurality of lower mold blocks 122 are connected in order and arranged around the lower end of the annular chamber, thereby enclosing the opening of the annular chamber.

Therefore, the plurality of upper mold blocks 121, the plurality of lower mold blocks 122, the plurality of tire periphery forming sliders 16 and the plurality of central mold posts 18 form an enclosed shaped chamber 10 which is annular shaped. Surely, the plurality of central mold posts 18 herein can also be formed integrally to form an annular shaped central mold post 18.

The aforesaid chamber 10 is provided therein with a plurality of tire inner chamber forming sliders 17, the plurality of tire inner chamber forming sliders 17 are connected in order and arranged around the circumference of the chamber 10; the tire inner chamber forming sliders 17 include a circumferential ring, the circumferential ring is arranged around the chamber 10, the external side of the circumferential ring is abutted against the tire periphery forming sliders 16, and the inner side of the circumferential ring is provided with a plurality of spacedly arranged bosses; there are gaps between the adjacent bosses. A flexible portion chamber 101 is formed among the bosses of the tire inner chamber forming sliders 17, the upper mold blocks 121, the lower mold blocks 122 and the forming parts 19, and the flexible portion chamber 101 is configured to be filled with a forming flexible portion 21.

An partitioned chamber 171 which is communicated with the upper mold blocks 121, the lower mold blocks 122 and the forming parts 19 is arranged between adjacent tire inner chamber forming sliders 17; the partitioned chamber 171 is configured to be filled with a forming partitioned gusset 23, the forming partitioned gusset 23 makes a plurality of isolating chambers 25 that are isolated from each other be formed in the flexible portion 21, and the partitioned chambers 25 have outwards openings.

An opening closure plate 107 is arranged outside the openings of above mentioned isolating chambers 25; the opening closure plate 107 encloses the openings of the isolating chambers 25 and is abutted against the partitioned gusset 23. Therefore, the plurality of opening closure plates 107 of the plurality of isolating chambers 25 are arranged annularly and an outer layer chamber 102 is formed between the plurality of opening closure plates 107 and the tire periphery forming sliders 16; the outer layer chamber 102 is arranged annularly. Thus, an external filling equipment is utilized to fill the outer layer chamber 102, hence an annular shaped out layer portion 22 is formed in the outer layer chamber 102, and the out layer portion 22 is abutted against the external side of the flexible portion 21 and isolates the openings of the isolating chambers 25 respectively.

The above mentioned manufacturing mold 1 fills twice when it is used to manufacture the multi-chamber tire. The flexible portion chamber 101 and the isolating chamber 171 are filled at the first time to form the flexible portion 21 and the partitioned gusset 23, and the flexible portion 21 is then left in the mold 1. Thus the tire periphery forming sliders 16 is detached, the tire inner chamber forming sliders 17 is removed from the mold 1, the opening closure plate 107 is abutted against the opening of the enclosed isolating chamber 25 and further against the partitioned gusset 23, and the tire periphery forming sliders 16 is mounted; at this moment, an outer layer chamber 102 is form between the tire periphery forming sliders 16 and a plurality of opening closure plates 107, thereby performing the second filling and forming an out layer portion 22.

According to the manufacturing mold 1 provided by the embodiment, the flexible portion 21 of the formed tire includes a plurality of isolating chambers 25 isolated with each other and arranged annularly. The adjacent isolating chambers 25 are isolated by the partitioned gussets 23. Therefore, when the out layer portion 22 is punctured by an external object and one isolating chamber 25 is pierced, only a certain single isolating chamber 25 is leaked; in this way, other un-punctured isolating chambers 25 are still in the gas-filled state, and the tire can still function and run in a high speed, thereby withstanding relatively big dynamic load along the radial direction; when the external object punctures the out layer portion 22 as well as adjacent isolating chambers 25, the partitioned gusset 23 between the two adjacent isolating chambers 25 withstands relatively big dynamic load, however, the tire can still function, and is adapt for running in a high speed; only in the case that adjacent isolating chambers are punctured by external bodies many times, the tire may be unsuitable to run in a high speed, and may require maintenance and repairing.

Above all, the multi-chamber tire manufactured by the manufacturing mold 1 provided by the embodiment can withstand multiple puncturing and still meet the high-speed run requirement, thereby extremely improving the service life and performance of the tire.

The bosses mentioned above has rough and uneven surfaces, therefore, the formed flexible portion 21 is also rough and uneven. Surely, the shapes of outer surfaces of the bosses can be configured according to the requirement of forming the flexible portion 21.

For the formation of the multi-chamber tire, the bosses above are cone-shaped, however, the bosses can be in other shapes, and the particular shapes can be determined according to actual requirements.

In this embodiment, the circumferential ring mentioned above is provided with a cone cylinder 172, the cone cylinder 172 extends along a radial direction and is abutted against the forming part 19, therefore, the partitioned gusset 23 forms ventilation holes after filling.

In this embodiment, the plurality of tire periphery forming sliders 16 can be composed of a plurality of parts; surely, the plurality of tire periphery forming sliders 16 can also be formed integrally, that is, formed into one part. The specific configuration can be set as actual requirements.

In the above mentioned manufacturing mold 1, the central mold post 18 is provided in its middle portion with a bulge loop bulging outwards; the upper mold blocks 121 and the lower mold blocks 122 are arranged alternately with each other and abutted against the upper end and the lower end of the bulge loop respectively, and the above mentioned forming part 19 is arranged on the bulge loop, thereby facilitating the securing and assembly of the upper mold blocks 121 and the lower mold blocks 122.

The above mentioned forming part 19 is provided with a filling plug 116, one end of the filling plug 116 is connected to the tire inner chamber forming sliders 17 and another end of which is abutted against the bulge loop. After the flexible portion 21 is formed, the filling plug 116 penetrates the flexible portion 21 and communicates the isolating chamber 25 with the outside, so that the isolating chamber 25 can be filled with gas with an external filling equipment.

Correspondingly, one or more above mentioned filling plug(s) 116 is/are respectively arranged at each isolating chamber 25. In order to improve the heat dissipation performance of the formed flexible portion 21, the filling plug 116 is sheathed with a metal loop 115, and then the metal loop 115 will be arranged in the flexible portion 21 after the flexible portion 21 is formed, which is convenient for the flexible portion 21 to dissipate heat.

In this embodiment, the tire inner chamber forming sliders 17 are shaped to be symmetrical, and the formed flexible portion 21 is also symmetrical.

Specifically, the gaps between the above mentioned bosses include a circumferential slot 104, an inner side of the circumferential slot 104 is communicated with a flexible portion chamber 101; two ends of the flexible portion chamber 101 are communicated with the isolating chamber 171. Then, after the first filling, the circumferential slot 104 forms a circumferential gusset 23. The sidewalls of the circumferential gusset 23 are respectively abutted against the flexible portion 21, the partitioned gusset 23 and the out layer portion 22, thereby isolating the isolating chambers 25 into side chambers which are isolated from each other and the two side chambers of the isolating chambers 25 are arranged along an axial direction.

When the isolating chambers 25 are configured as two side chambers, each isolating chamber 25 needs to be provided with two filling plugs 116 respectively and the two filling plugs 116 are respectively arranged at two ends of the circumferential slot 104. Then, only after the circumferential gusset 23 is formed can the two filling plugs 116 be communicated with the two side chambers respectively.

The inner side of the above mentioned circumferential slot 104 is communicated with the flexible portion chamber 101, that is, the inner side of the circumferential slot 104 is provided with an opening; during the second filling process, the opening is helpful to remove the tire inner chamber forming sliders 17 out from the mold 1.

In this embodiment, the gaps between the bosses further include auxiliary circumferential slots 103, inner sides of the auxiliary circumferential slots 103 are communicated with a flexible portion chamber 101; two ends of each auxiliary circumferential slot 103 are connected with the isolating chamber 171. Then, after the first filling, the auxiliary circumferential slots 103 form an auxiliary circumferential gusset 24. The sidewalls of the auxiliary circumferential gusset 24 are respectively abutted against the flexible portion 21, the isolating plate 23 and the out layer portion 22, so that the isolating chamber 25 is isolated into chamber units 106 which are isolated from each other, and the two chamber units 106 of the side chamber are arranged along an axial direction.

The filling plugs 116 of above mentioned corresponding side chambers are arranged at one end of the auxiliary circumferential slot 103, and include a pipeline 117 which extends to the other end. When the chamber units 106 of each side chamber are formed, the filling plug 116 of each side chamber can be connected with two chamber units 106, therefore, the two chamber units 106 of each side chamber can be filled with gas by only one filling plug 116, thereby avoiding over numbered filling plugs 116 and facilitating the manufacturing of the multi-chamber tire.

In this embodiment, in order to connect the tire periphery forming sliders 16 steadily between the upper mold blocks 121 and the lower mold blocks 122 respectively, the external sides of the upper holding plate 11 and the lower holding plate 13 respectively extend beyond the tire periphery forming sliders 16, and the tire periphery forming sliders 16 is provided with a holding block 14; the holding block 14 is arranged to extend along an axial direction and be connected with the tire periphery forming sliders 16 by a locking structure 15. Thus, during the assembly of the mold 1, the tire periphery forming sliders 16 can be moved by directly operating the locking structure 15, so that the tire periphery forming sliders 16 can be abutted against the external sides of the upper mold blocks 121 and the lower mold blocks 122, thereby making the assembly of the whole mold 1 be more stable.

Specifically, the above mentioned locking structure 15 includes a screw 151 which penetrates the holding block 14; the screw 151 passes through the holding block 14 and is correspondingly connected to the tire periphery forming sliders 16. Thus, the tire periphery forming sliders 16 can be moved along the radial direction by turning the screw 151, so that the tire periphery forming sliders 16 can move towards or against the upper mold blocks 121 and the lower mold blocks 122.

Surely, in order to facilitate the disassembly of the mold 1, the external side of the screw 151 is provided with a puller 152. Thus, during the disassembly of the mold 1, the screw 151 can be disconnected from connecting hooks of the tire periphery forming sliders 16 by turning the screw 151. By directly pulling the puller 152 outwards, the screw 151 can drive the tire periphery forming sliders 16 to move outwards.

In order to press the upper mold blocks 121 and the lower mold blocks 122 tightly between the upper holding plate 11 and the lower holding plate 13, a screw bolt 113 runs through between the upper holding plate 11 and the lower holding plate 13, and the screw bolt 113 is arranged along an axial direction. The screw bolt 113 passes through the upper holding plate 11 and the lower holding plate 13 respectively; therefore, the gap between the upper holding plate 11 and the lower holding plate 13 can be adjusted through turning the screw bolt 113.

When the above mentioned manufacturing mold 1 is in a debugging stage, the mold removal operation can be manual; if the tires are mass produced, the mold removal operation can be automatic, and the details thereof are as follows.

A plurality of first magnetic conducting blocks 111 are located on the upper holding plate 11, the plurality of first magnetic conducting blocks 111 are arranged annularly and aligned with the upper mold blocks 121 respectively; surely, they can also be not aligned with the upper mold blocks 121; the upper holding plate 11 is made of non-magnetic conducting material such as aluminum. Thus, the first magnetic conducting block 111 will not produce magnetic force inside the mold 1, and can reduce the weight of the holding plate 11; in this way, it is convenient for an external mechanical arm to lift the upper holding plate 11 with less force, thereby realizing automatic disassembly of the upper mold blocks 121.

A second magnetic conducting block 112 is arranged on the upper holding plate 11, and the second magnetic conducting block 112 is located at the inner side of the plurality of central mold posts 18.

A power block is arranged outside the above mentioned tire periphery forming sliders 106; by the connection of the power block with an external air cylinder or others, the disassembly of the tire periphery forming sliders can be realized.

The manufacturing mold 1 secured by the above mentioned locking structure is mainly suitable for manual tire production in small quantity. When mass production is needed, an upper impacting structure can be utilized to replace the locking structure and be connected with the gas cylinder circumferentially; furthermore, an electromagnetism connection platform is arranged in the tire inner chamber forming sliders 17.

The above contents are just preferred embodiments of the invention, and should not be deemed as limitation to the invention. Any modifications, equivalences and improvements made within the spirit and principle of the invention should be included in the protection scope of the invention.

What is claimed is:

1. A multi-chamber tire manufacturing mold, wherein the multi-chamber tire manufacturing mold comprises an upper holding plate and a lower holding plate; the upper holding plate and the lower holding plate are arranged alternately and in parallel with each other with intervals between the upper holding plate and the lower holding plate;
   a plurality of tire periphery forming sliders, upper mold blocks, lower mold blocks and central mold posts are arranged in the intervals; the tire periphery forming sliders are arranged along the height direction of the intervals, and the plurality of tire periphery forming sliders are connected in order and arranged in an annular fashion; the central mold posts are arranged along the height direction of the intervals in an annular fashion, and located at an inner side of the plurality of tire periphery forming sliders, and arranged alternately with the plurality of tire periphery forming sliders; the central mold post is configured inside with a forming part which is arranged around the central mold post;
   a lower end of the upper holding plate is connected with a plurality of upper mold blocks which is arranged in a circle; an enclosed chamber is formed among the plurality of upper mold blocks, the plurality of lower mold blocks, forming parts and the plurality of tire periphery forming sliders;
   the chamber is provided therein with a plurality of tire inner chamber forming sliders, which are connected in order arranged around the chamber; the tire inner chamber forming slider includes a circumferential ring which is arranged around a circumference; an external side of the circumferential ring is abutted against the tire periphery forming sliders, an inner side of the circumferential ring is provided with a plurality of spacedly arranged bosses, and there are gaps between adjacent bosses; a flexible portion chamber configured to fill the forming flexible portion is form among the bosses of the tire inner chamber forming sliders and the forming part, the upper mold blocks, and the lower mold blocks; an partitioned chamber, which is communicated with the upper mold blocks, the lower mold blocks, and the forming parts and fills a forming partitioned gusset so as to form a plurality of isolating chambers which are isolated from each other in the flexible portion, is arranged between adjacent tire inner chamber forming sliders; the partitioned chamber has an outwards opening;
   at the opening of the partitioned chamber there is provided with an opening closure plate, which is configured to be abutted against the opening of the partitioned chamber after the partitioned chamber is filled with the forming flexible portion and the tire inner chamber forming sliders are removed; an outer layer chamber configured to be filled with the outer layer chamber of the forming outer layer portion is formed between the opening closure plates and the tire periphery forming sliders; the outer layer chamber is arranged in a circle.

2. The multi-chamber tire manufacturing mold of claim 1, wherein surfaces of the bosses are rough and uneven.

3. The multi-chamber tire manufacturing mold of claim 1, wherein the plurality of tire periphery forming sliders or the plurality of tire inner chamber forming sliders are formed integrally.

4. The multi-chamber tire manufacturing mold of claim 1, wherein a circumferential ring of the tire inner chamber forming sliders is provided with a plurality of cone cylinders arranged along radial directions, and the cone cylinders are abutted against the forming part.

5. The multi-chamber tire manufacturing mold of claim 1, wherein an inner side of a middle portion of the central mold post is provided with a bulge loop; the upper mold blocks and the lower mold blocks are abutted against the upper ends and the lower ends of the bulge loop and an inner side forming element respectively, the forming element is abutted against the bulge loop and provided thereon with a plurality filling plugs, the filling plugs are sheathed with metal loops, and the filling plugs are abutted against the tire inner chamber forming sliders.

6. The multi-chamber tire manufacturing mold of claim 1, wherein gaps between the bosses include a circumferential slot which is respectively communicated with the flexible portion chamber and the partitioned chamber and configured to be filled with a forming circumferential gusset.

7. The multi-chamber tire manufacturing mold of claim 1, wherein gaps between the bosses further include an auxiliary circumferential slot which is respectively communicated with the flexible portion chamber and the partitioned chamber and configured to be filled with an auxiliary forming circumferential gusset.

8. The multi-chamber tire manufacturing mold of claim 1, wherein the upper holding plate and the lower holding plate extend beyond the tire periphery forming sliders and are provided with holding blocks respectively, and each holding block is provided with a locking structure connected with the tire periphery forming sliders and configured to enable the tire periphery forming sliders to move.

9. The multi-chamber tire manufacturing mold of claim 8, wherein the locking structure includes a screw runs through the holding block and an external chamber slider respectively.

10. The multi-chamber tire manufacturing mold of claim 1, wherein a screw bolt runs between the upper holding plate and the lower holding plate; the screw bolt is arranged along an axial direction.

11. The multi-chamber tire manufacturing mold of claim 1, wherein the upper holding plate is provided thereon with a plurality of first magnetic conducting blocks, and the plurality of first magnetic conducting blocks are arranged in a circle.

* * * * *